(12) United States Patent
Pritchard et al.

(10) Patent No.: US 7,809,861 B1
(45) Date of Patent: Oct. 5, 2010

(54) SYSTEM MEMORY MAP DECODER LOGIC

(75) Inventors: Jeffrey Orion Pritchard, Santa Cruz, CA (US); Peter Hutkins, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 724 days.

(21) Appl. No.: 10/856,539

(22) Filed: May 27, 2004

(51) Int. Cl.
*G06F 13/14* (2006.01)

(52) U.S. Cl. .............................. 710/9; 710/38; 710/316; 710/317

(58) Field of Classification Search ........................ None
See application file for complete search history.

(56) References Cited

U.S. PATENT DOCUMENTS

| | | | | |
|---|---|---|---|---|
| 4,805,087 A | * | 2/1989 | Frankel et al. .............. 700/180 |
| 5,319,754 A | * | 6/1994 | Meinecke et al. ............. 710/52 |
| 5,555,438 A | * | 9/1996 | Blech et al. .................... 710/30 |
| 5,561,817 A | * | 10/1996 | McCormack et al. ......... 710/22 |
| 5,933,812 A | * | 8/1999 | Meyer et al. ................... 705/15 |
| 7,145,903 B2 | * | 12/2006 | Gutierrez .................... 370/362 |

OTHER PUBLICATIONS

SOC Solutions, SoC-IP1000 Address Decoder, © 2003.

* cited by examiner

*Primary Examiner*—Ilwoo Park
(74) *Attorney, Agent, or Firm*—Weaver Austin Villeneuve & Sampson LLP (57) ABSTRACT

Methods and apparatus are provided optimizing system memory map decoder logic. A system is configured with multiple master and slave components. Using information known about the system configuration, optimized decoder logic can be configured. Critical path delay and system resource usage are reduced by optimizing decoder logic.

7 Claims, 7 Drawing Sheets

SYSTEM MEMORY MAP DECODER LOGIC

BACKGROUND OF THE INVENTION

1. Field of the Invention

The present invention relates to system memory maps. In one example, the present invention relates to methods and apparatus for optimizing decoder logic associated with a system memory map.

2. Description of Related Art

Conventional processing systems include a variety of components. Master components such as processors and Ethernet components are configured to access a variety of slave components such as memory, timers, interface ports, etc. Master components are typically operable to access slave components by using a system memory map.

A system memory map shows a variety of components assigned to various address ranges within system memory. To access a particular slave component, a processor can perform read and write accesses to a particular range of addresses in memory. In conventional systems, decoder logic performs address comparisons to determine what component is being accessed.

However, conventional mechanisms for performing decoder operations are inefficient. Consequently, it is desirable to provide improved methods and apparatus for implementing decoder logic for handling system memory maps.

SUMMARY OF THE INVENTION

Methods and apparatus are provided optimizing system memory map decoder logic. A system is configured with multiple master and slave components. Using information known about the system configuration, optimized decoder logic can be configured. Critical path delay and system resource usage are reduced by optimizing decoder logic.

In one embodiment, a processing system is provided. The processing system includes a plurality of slave components coupled to an interconnection module. Each of the plurality of slave components has an address range associated with a system memory map. The processing system also includes a master component configured to access the plurality of slave components through the interconnection module. The master component is operable to select slave components for access using the system memory map. The first slave component is selected if the target address falls within the first slave component address range and a second slave component is selected if the target address does not fall within the first slave component address range and a bit subsequence of the target address matches a second slave component address range bit subsequence.

In another embodiment, a method for selecting a component is provided. It is determined if a first slave component includes a target address in a first slave component address range. A second slave component is selected if the target address does not fall within the first slave component address range and a bit subsequence of the target address matches a second slave component address range bit subsequence.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Conventional processing systems include a variety of different components, such as primary or master components and secondary or slave components. Primary components typically communicate with secondary components by using a memory map. Anything used to identify ranges of memory addresses and the purposes of the ranges is referred to herein as a memory map, system memory map, or address map. In one example, a memory map identifies the address ranges corresponding to various secondary components. For example, addresses between 0x0000 and 0x0FFF may be used by a microcontroller to access a Parallel Input/Output (PIO) and addresses between 0x1000 and 0x2FFF are used to access a Timer. Other addresses may be used for data. Processing systems use decoder logic to allow identification and access to various components.

In many systems having nonprogrammable address decoders or microcontrollers, a memory map may be configured in a variety of ways. Little may be known about where particular components are located in the system memory map. In some examples, a system memory map is dynamic, and new components are dynamically added and removed from the system memory map. In other examples, decode logic is configured before a system memory map is known. In systems where the memory map is dynamic or not known before decode logic is generated, no optimizing assumptions can be made about the system memory map. Consequently, decoder logic is configured to allow access to components within any possible range of addresses in the memory map.

However, in some systems, a memory map is known before decoder logic is generated. In one example, a system on a programmable chip has a known configuration of primary and secondary components before address decoding logic is configured. Consequently, the techniques of the present invention recognize that using conventional decode logic would be inefficient as knowing a system memory map before decoder logic is generated allows for a variety of optimizations.

Decoder logic uses a notable amount of chip resources and can be expensive to implement. In many instances, decoder logic increases the time needed to access secondary components. The delay and chip resource usage are particularly significant and the context of programmable chips. Adding specialized circuitry to nonprogrammable chips such as Application Specific Integrated Circuits (ASICs) for performing nonoptimized address decoding may increase delay and costs. However, the increased delay and resource usage may not be that significant. However, on programmable chips, the increased delay and resource usage can be substantial.

Consequently, the techniques and mechanisms of the present invention provide optimized decoder logic that allows efficient decoding based on a known address map. In one example, fewer address bits are needed to differentiate between addresses and address ranges. In some examples, some secondary or slave components may be selected without any address comparison for the address ranges associated with the particular secondary component. Techniques of the present invention also allow generator logic to rearrange the address map of secondary components to increase decoder logic efficiency. Consequently, a memory map can be arranged to optimize decoder logic and minimize resource usage.

Figure 1:
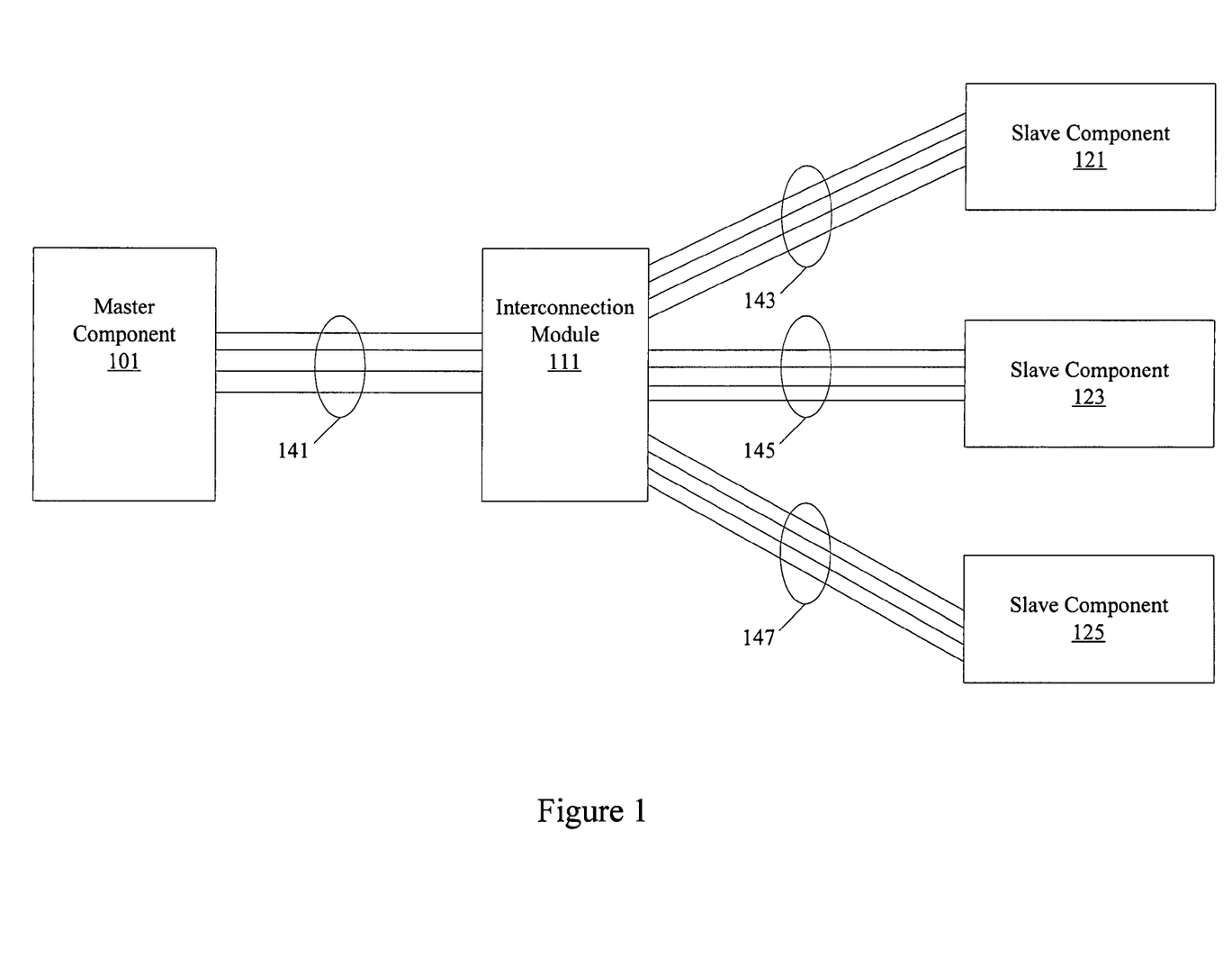
FIG. 1 is a diagrammatic representation showing a processing system.

FIG. 1 is a diagrammatic representation showing a processing system having a variety of components. A master component 101 is coupled to slave components 121, 123, and 125 through an interconnection module 111. In one example, the interconnection module 111 is a bus. In another example, the interconnection module 111 is an interconnection fabric. Links 141, 143, 145, and 147 include both control and data lines to allow a master component 101 to access the various slave components.

According to various embodiments, the master component 101 and the slave components 121, 123, and 125 are provided as distinct devices in a computer system. In other examples, the components are provided on a single nonprogrammable device. In still other examples, the components are provided on a single programmable chip.

The data and control lines can include address, read, write, wait request, clock, data valid, and chip select lines to allow communication between primary and secondary components. Address, data, control, wait request, clock, data valid, and chip select lines are herein referred to collectively as data and control lines. In some examples, data and control lines may include only a subset of the noted lines. In one example, a data valid line allows a secondary component to indicate to a primary component that data is available. A wait request line is used indicate when a master component should wait before accessing the slave component to allow for variable latency. The chip select line is used to select a particular slave component for access.

According to various embodiments, data and control lines are automatically generated using a tool or generator program operable to configure a programmable chip. In some instances, a user can select, parameterize, and connect components automatically using the programmable chip tool.

A master component typically selects a slave component for access based on the address of the target request. In one example, addresses are passed to an address decoder to identify the slave component corresponding to that address. An address decoder can be associated with an interconnection module, decoder circuitry, or may be integrated in a master component. In typical instances, decoder logic compares the address of the request with the address ranges associated with each of the slave components. For example, if the slave components are 16-bit devices, a 16-bit target address is compared to 16-bit addresses associated with each slave component.

In one simplified example, the address of an access request is 0x00F0 (representing a bit sequence 0000 0000 1111 0000). Decoder logic can determine that the address of the access request falls within the range 0x0000-0x0FFF (representing bit sequences ranging from 0000 0000 0000 0000- 0000 1111 1111 1111) allocated to a slave component 121. Comparisons are made to determine if the 0x00F0 address falls within the range of the slave component 121. If the address falls within the range, a master component 101 and associated interconnection module 111 can assert a chip select line to access slave component 121.

Address comparisons are typically performed by comparing the entire sequence of bits associated with the target address in the address ranges. In some systems, implementing logic to perform the comparisons is relatively straightforward and may lead to nominal delay in a system. Full sequences of bits are compared because nothing is known about a memory map and the target address may reside anywhere in the memory map. However, techniques of the present invention recognize that optimizations can be made to decoder logic to allow more efficient address decoding. In some examples, only subsequences of bits are compared to allow selection of slave components. For example, the most significant four bits or the least significant four bits of an address may be compared. In another example, the subsequence middle eight bits may be compared. Any sequence of bits less than the full sequence of address bits is referred to herein as a subsequence of bits.

Figure 2:
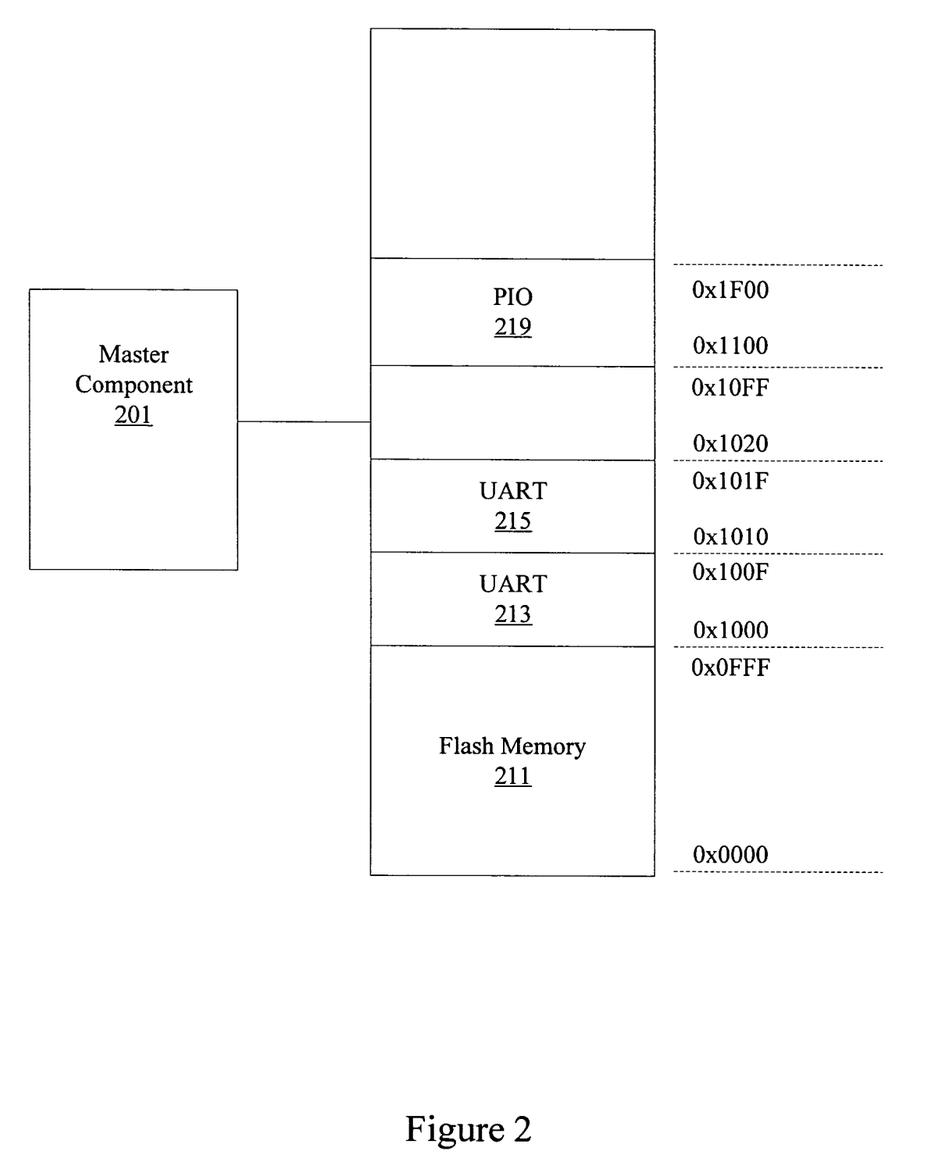
FIG. 2 is a diagrammatic representation showing a system memory map, address decoder

FIG. 2 is a diagrammatic representation showing a system memory map. A master component 201 has access to memory map components parallel input/output (PIO) 219, Universal Asynchronous Receiver Transmitters (UART) 213 and 215, and flash memory 211. In one example, flash memory 211 is mapped to address range 0x0000 to 0x0FFF, UART 213 is mapped to address range 0x1000 to 0x100F, and UART 215 is mapped to address range 0x1010 to 0x101F. The memory map can be expressed as follows:

Flash: 0x0000->0x0FFF (0000 0000 0000 0000->0000 1111 1111 1111)

UART1: 0x1000->0x100F (0001 0000 0000 0000->0001 0000 0000 1111)

UART2: 0x1010->0x101F (0001 0000 0001 0000->0001 0000 0001 1111)

In one example, decoder logic first determines if the flash memory is being selected:

flash_select<=(address[12]==1'b0);

The decoder logic makes this determination by comparing bit 12 (where bits are numbers from 15 to 0 from left to right in a 16-bit number) to determine if the values is 0. If the value is zero, it is determined that flash memory 211 is being accessed. If the value is one, then the technique proceeds to perform additional comparisons:

UART1_select<=(address[12:4]=={9'h100, 4'hx});

The decoder logic determines if the address falls within the UART address range by comparing the 13-bit target address to a combined 9-bit fixed sequence and a 4-bit unknown sequence. That is, if the 9-bit fixed sequence matches, UART1 is selected. The remaining 4-bits can be any value. As long as the 9-bit fixed sequence matches, the target address falls within the UART1 address range. The decoder can then determine if the target address falls within the UART2 address range using the following comparison:

UART2_select<=(address[12:4]=={9'h101, 4'hx})

Extensive comparisons requiring over 20 decodes are needed because the decoder logic cannot make any assumptions about the system address map. For example, if the target address is not within the address ranges of the flash memory or the UART1 213, the address decoder cannot assume that the target address falls within the range of UART2 215. For example, the target address may actually fall within the address range of PIO 219.

However, according to various embodiments of the present invention, a system address map is known before decoder logic is configured. The number of address decodes can be reduced. In one example, the address decoder intelligently arranges components in a system memory map to allow comparison of the fewest number of bits. The target address is presumed to fall within the address range associated with a particular component if the target address does not fall within the address range of another component and a particular bit matches. In one example, the technique could be implemented as follows:

flash_select<=(address[12]==1'b0);
UART1_select<=!flash_select & !address[4];
UART2_select<=!flash_select & !UART1_select;

A flash memory 211 is selected if bit 12 is a 0. UART1 213 is selected if the flash memory 211 was not selected and bit 4 is a 0. UART2 215 is selected if neither the flash memory 211 nor the UART1 213 were selected. This technique uses a minimum number of address decodes that is made possible because a system address map is known.

The techniques of the present invention recognize that efficiency can be improved by comparing a target address against the largest address ranges first. Minimal address decoding is used when slave components can be differentiated by a single bit in their address ranges. In one example, the decoding can be implemented using a simple comparator.

Figure 3:
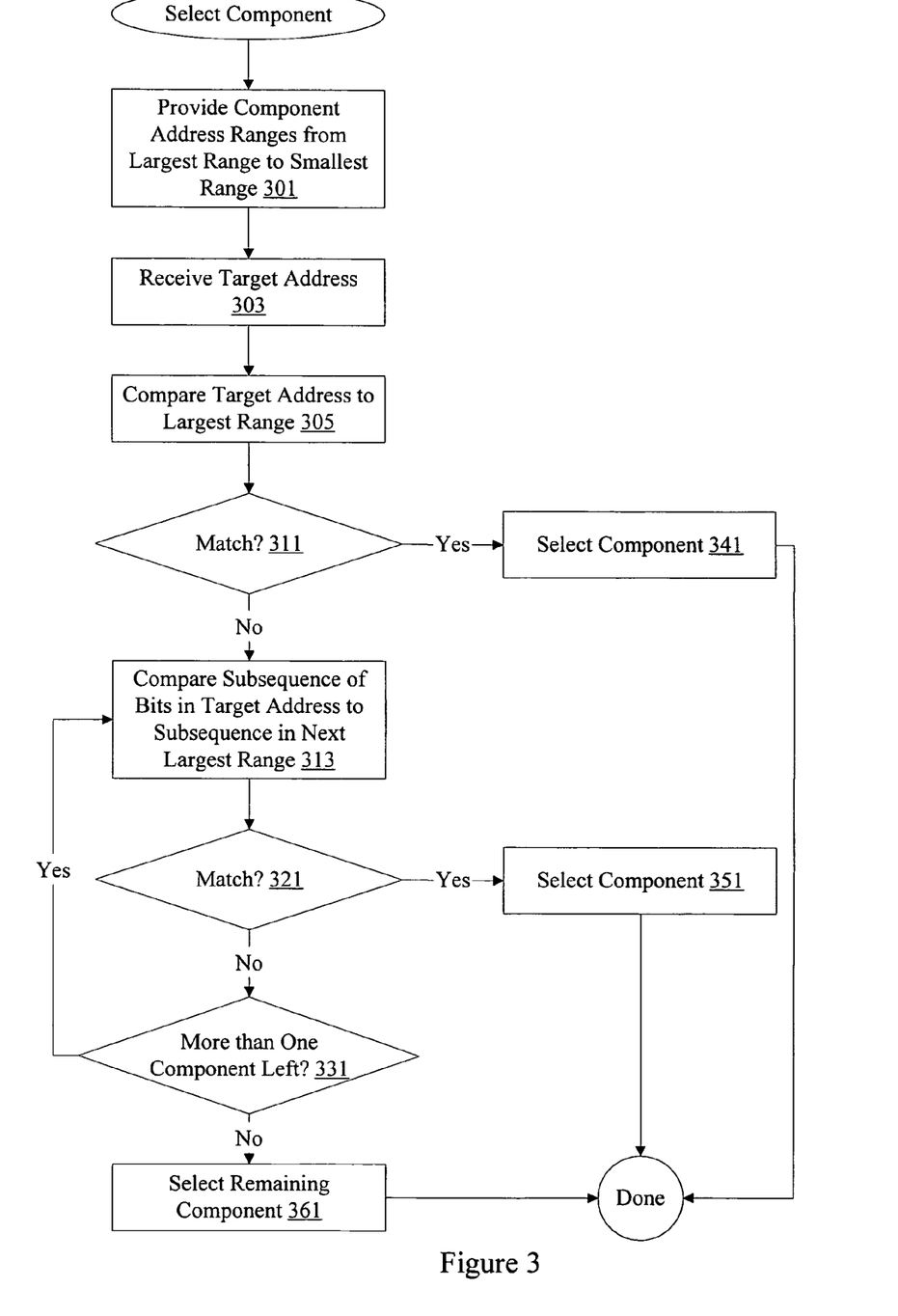
FIG. 3 is a flow process diagram showing a technique for selecting a secondary component.

FIG. 3 is a flow process diagram showing a technique for selecting slave components. At 301, component address ranges are provided and arranged in order of largest to smallest. The techniques of the present invention recognize that selecting components by comparing a target address to the largest range first allows for the greatest optimization. At 303, a target address is received. Any address used to select access or access a slave component is referred to herein as a target address. At 305, the target address is compared to the largest address range. If a match is found at 311, the component is selected at 341. If there is no match, a subsequence of bits in the target address is compared to a subsequence in the next largest address range at 313. If there is a match, the component is selected at 351. If there is no match at 321, it is determined if there is more than one slave component left at 331. If there is more than one slave component left, other subsequences of bits in the target address are compared with subsequences in the next largest address range. If only one component remains at 331, the remaining component is selected at 361.

It should be noted that although address comparisons are performed based on the largest address range first, other sequences can be used with similar benefits. In other examples, components are arranged sparsely on a system memory map to allow single bit differentiation between the various components. In another example, three bits are sufficient for distinguishing between the various components. A default component is selected if no other components are selected.

Although the techniques and mechanisms of the present invention are applicable to a variety of different processing systems, the techniques and mechanisms of the present invention are particularly applicable to soft core processors on programmable chips and programmable chip systems. Logic is often at a premium on programmable chips, so optimizing decode logic is often particularly beneficial.

The techniques of the present invention also further contemplate optimizing a memory map to allow improved decoder functionality. In one example, secondary component address ranges are all configured to begin at byte aligned or word aligned addresses. By having address ranges begin at particular aligned addresses even if some memory is left unused, decode logic can be implemented by using a minimal number of bits.

Figure 4:
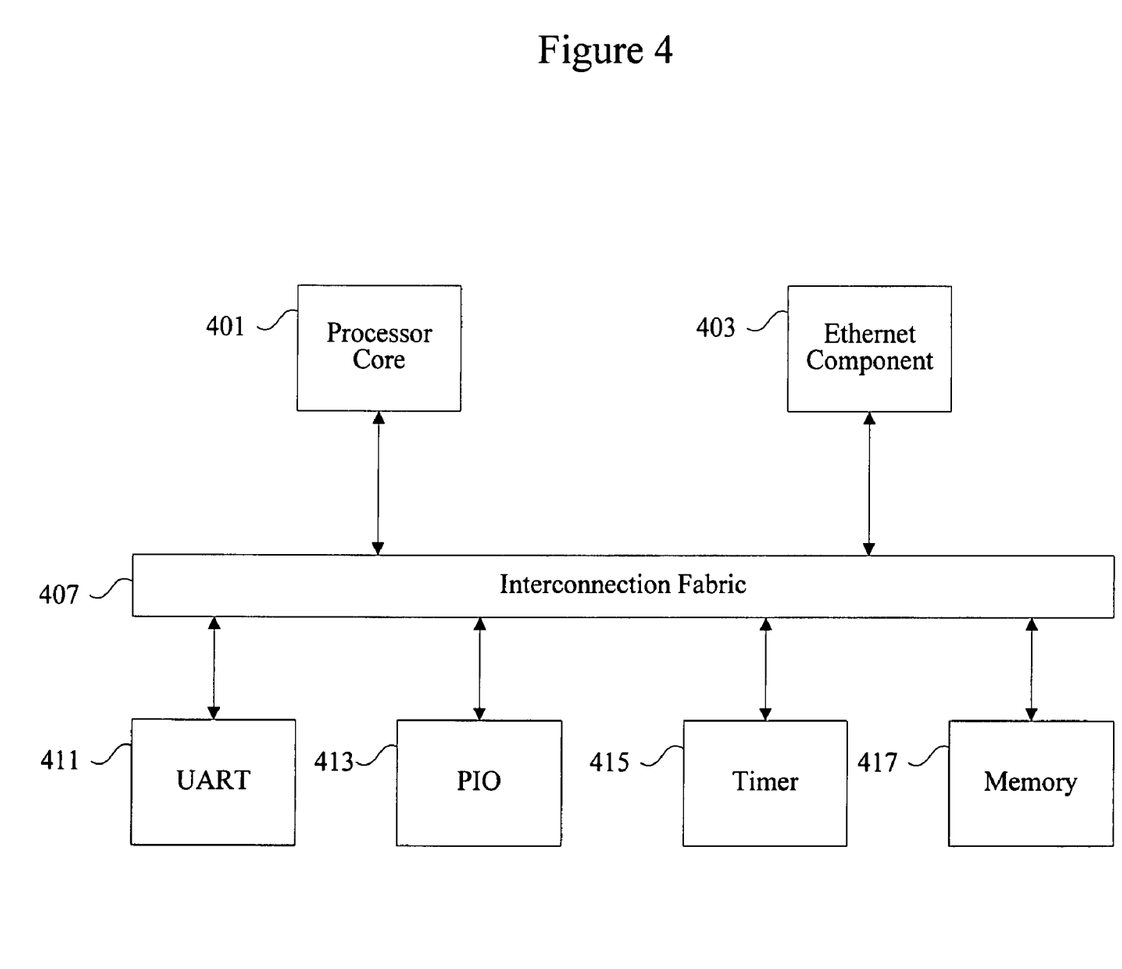
FIG. 4 is a diagrammatic representation of a programmable chip.

FIG. 4 is a diagrammatic representation showing one example of a system on a programmable chip that can be used to implement the techniques of the present invention. The system includes a processor core, a hardware accelerator, peripheral devices, and peripheral interfaces. The processor core size can be optimized by reusing subcircuitry to perform both branch and non-branch operations. Peripheral devices and peripheral interfaces are herein referred to as components. The system on a programmable chip includes processor core 401 and an Ethernet component 403 as well as peripheral components UART 411, PIO 413, timer 415, and data memory 417. In some examples, the Ethernet component 403 is instead a Digital Signal Processing (DSP) core, a cryptography accelerator, or a video processor. It should be noted that the system can include both on-chip memory 417 and off-chip memory. In one example, the data memory 417 can support variable latency or fixed latency access. The components are interconnected using an interconnection fabric 407. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 5:
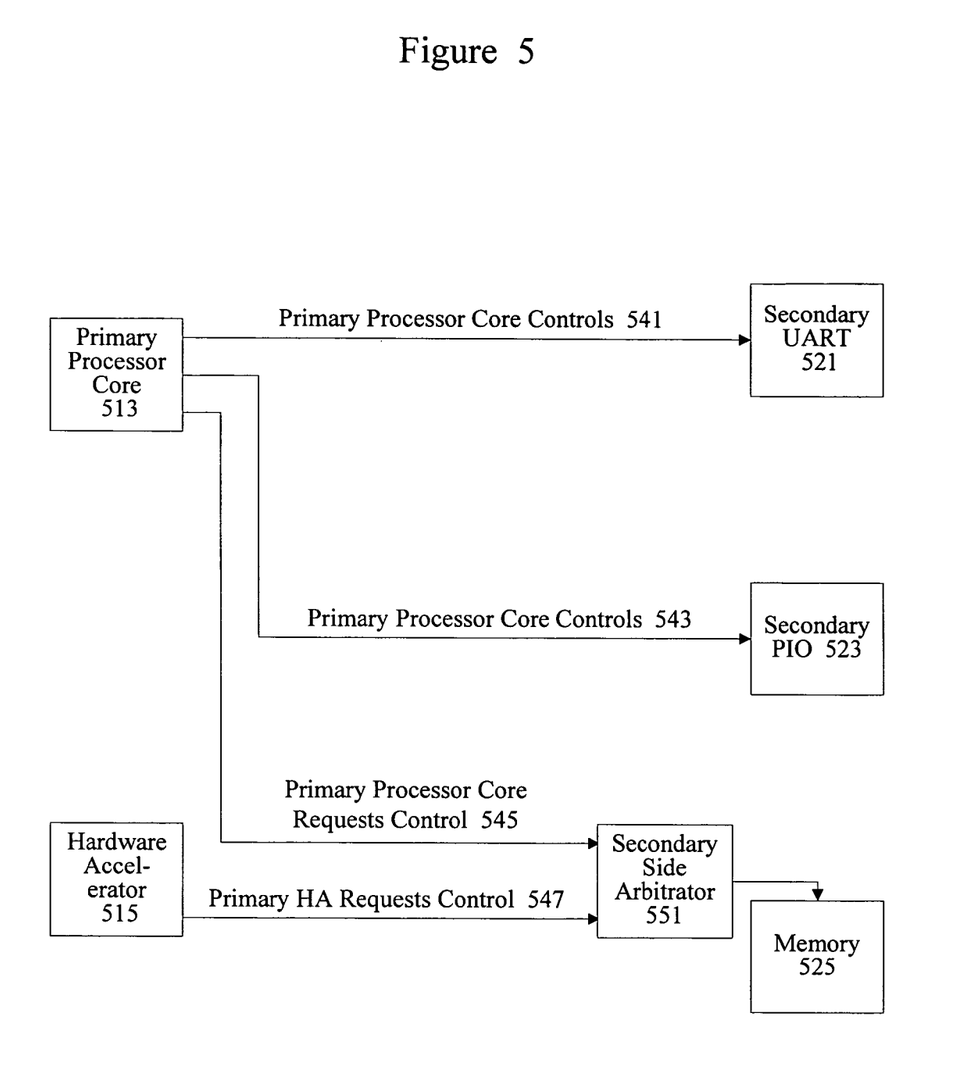
FIG. 5 is a diagrammatic representation showing an interconnection fabric.

FIG. 5 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 525 is associated with a secondary side arbitrator 551. However, secondary components UART 521 and PIO 523 are not associated with any arbitrator. In one example, secondary component UART 521 and secondary PIO 523 can only be accessed by primary CPU 513 and not by primary Ethernet device 515. A secondary memory component 525, however, can be accessed by both primary CPU 513 and primary Ethernet device 515.

According to various embodiments, a secondary side arbitrator 551 allows a first secondary component in a system to be accessed by a first primary component at the same time a second secondary component in the system is accessed by a second primary component. For example, peripheral interface 525 can be accessed by primary Ethernet 515 through secondary side arbitrator 551 at the same time, secondary UART 521 is accessed by primary CPU 513.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 6:
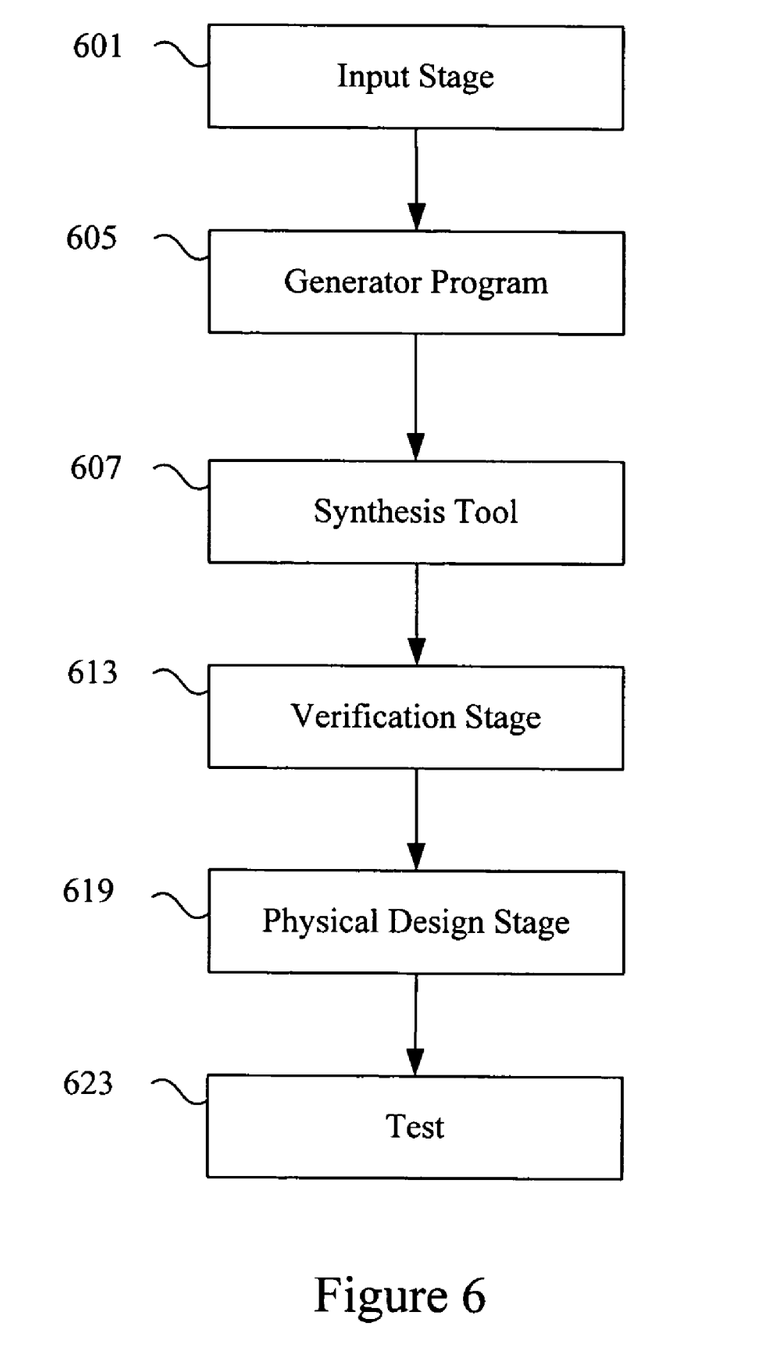
FIG. 6 is a diagrammatic representation showing a technique for implementing the programmable chip.

FIG. 6 is a diagrammatic representation showing implementation of a system on a programmable chip. An input stage 601 receives selection information typically from a user for logic such as a processor core as well as other components such as a streaming output device to be implemented on an electronic device. In one example, the input received is in the form of a high-level language program. A generator program 605 creates a logic description and provides the logic description along with other customized logic to any of a variety of synthesis tools, place and route programs, and logic configuration tools to allow a logic description to be implemented on an electronic device.

In one example, an input stage 601 often allows selection and parameterization of components to be used on an electronic device. The input stage 601 also allows configuration of variable or fixed latency support. In some examples, components provided to an input stage include intellectual property functions, megafunctions, and intellectual property cores. The input stage 601 may be a graphical user interface using wizards for allowing efficient or convenient entry of information. The input stage may also be a text interface or a program reading a data file such as a spreadsheet, database table, or schematic to acquire selection information. The input stage 601 produces an output containing information about the various modules selected.

In typical implementations, the generator program 605 can identify the selections and generate a logic description with information for implementing the various modules. The generator program 605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 605 identifies pointers and provides ports for each pointer. One tool with generator program capabilities is System on a Programmable Chip (SOPC) Builder available from Altera Corporation of San Jose, Calif. The generator program 605 also provides information to a synthesis tool 607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 609.

As will be appreciated by one of skill in the art, the input stage 601, generator program 605, and synthesis tool 607 can be separate programs. The interface between the separate programs can be a database file, a log, or simply messages transmitted between the programs. For example, instead of writing a file to storage, the input stage 601 can send messages directly to the generator program 605 to allow the generator program to create a logic description. Similarly, the generator program can provide information directly to the synthesis tool instead of writing HDL files. Similarly, input stage 601, generator program 605, and synthesis tool 607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 607.

A synthesis tool 607 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 613 typically follows the synthesis stage 607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 613, the synthesized netlist file can be provided to physical design tools 619 including place and route and configuration tools. A place and route tool typically locates logic cells on specific logic elements of a target hardware device and connects wires between the inputs and outputs of the various logic elements in accordance with logic required to implement an electronic design. The device can also be physically tested at 623.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 601, the generator program 605, the synthesis tool 607, the verification tools 613, and physical design tools 619 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 7:
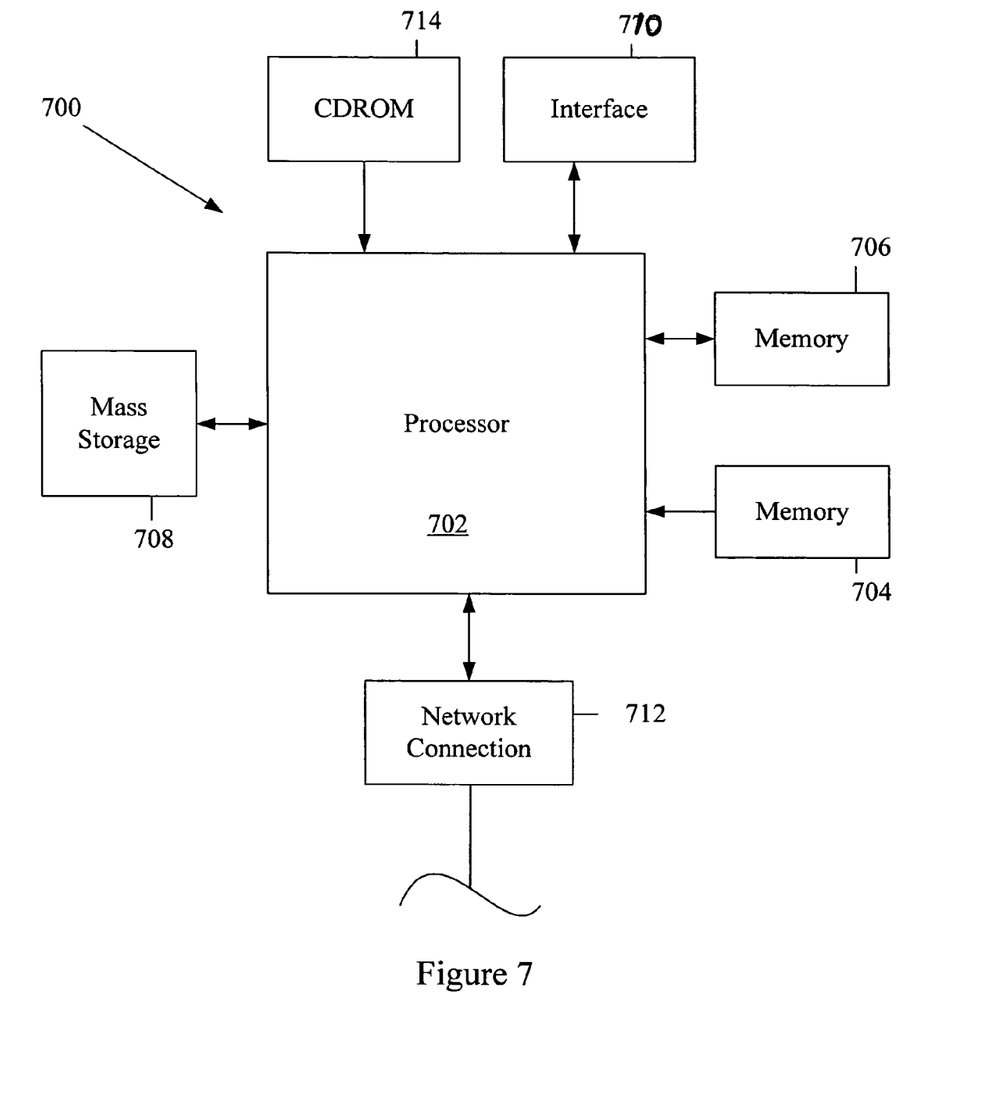
FIG. 7 is a diagrammatic representation depicting a computer system.

FIG. 7 illustrates a typical computer system that can be used to implement a programmable chip. The computer system 700 includes any number of processors 702 (also referred to as central processing units, or CPUs) that are coupled to devices including memory 706 (typically a random access memory, or "RAM"), memory 704 (typically a read only memory, or "ROM"). The processors 702 can be configured to generate a test sequences for any designated processor. As is well known in the art, memory 704 acts to transfer data and instructions uni-directionally to the CPU and memory 706 is used typically to transfer data and instructions in a bi-directional manner.

Both of these memory devices may include any suitable type of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than memory. The mass storage device 708 can be used to hold a library or database of prepackaged logic or intellectual property functions, as well as information on generating particular configurations. It will be appreciated that the information retained within the mass storage device 708, may, in appropriate cases, be incorporated in standard fashion as part of memory 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. It should be noted that the system 700 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 708 or 714 and executed on CPU 708 in conjunction with primary memory 706.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A processing system, comprising:
    a plurality of slave components including a first slave component and a second slave component coupled to an interconnection module, each of the plurality of slave components having an address range associated with a programmable chip system memory map, wherein the interconnection module is a simultaneous multiple master interconnection fabric including a first slave side arbitrator corresponding to the first slave component and a second slave side arbitrator corresponding to the second slave component;
    a first master component configured to access the plurality of slave components through the interconnection module, the first master component operable to select slave components for access using the system memory map, wherein the target address is compared to a largest address range first and the next largest address range second, wherein if only a last address range remains, a slave component corresponding to the last address range is selected without performing any comparison.

2. The processing system of claim 1, wherein the processing system comprises a plurality of master components.

3. The processing system of claim 1, wherein the plurality of slave components comprise UART and memory.

4. The processing system of claim 1, wherein the master component is a processor.

5. A method for selecting a component, the method comprising:
    comparing a target address to a largest address range first and a next largest address range second, the largest address range corresponding to a first slave component and the next largest address range corresponding to a second slave component, wherein if only a last address range remains, a third slave component corresponding to the last address range is selected without performing any comparison;
    wherein the first and second slave components are connected to a simultaneous multiple master interconnection fabric, wherein the simultaneous multiple master interconnection fabric allows a first master component to access the first slave component using a first slave side arbitrator at the same time a second master component is accessing the second slave component using a second slave side arbitrator.

6. The method of claim 5, wherein the interconnection module is coupled to a plurality of master components.

7. An apparatus for selecting a component, the apparatus comprising:
    means for comparing a target address to a largest address range first and a next largest address range second, the largest address range corresponding to a first slave component and the next largest address range corresponding to a second slave component, wherein if only a last address range remains, a third slave component corresponding to the last address range is selected without performing any comparison;
    wherein the first and second slave components are connected to a simultaneous multiple master interconnection fabric, wherein the simultaneous multiple master interconnection fabric allows a first master component to access the first slave component using a first slave side arbitrator at the same time a second master component is accessing the second slave component using a second slave side arbitrator.

* * * * *